United States Patent [19]
Evans

[11] Patent Number: 6,029,167
[45] Date of Patent: Feb. 22, 2000

[54] METHOD AND APPARATUS FOR RETRIEVING TEXT USING DOCUMENT SIGNATURES

[75] Inventor: David A. Evans, Pittsburgh, Pa.

[73] Assignee: Claritech Corporation, Pittsburgh, Pa.

[21] Appl. No.: 08/900,784

[22] Filed: Jul. 25, 1997

[51] Int. Cl.[7] .................................................. G06F 17/00
[52] U.S. Cl. .............................. 707/4; 706/45; 707/104; 707/501
[58] Field of Search ................ 707/1–206, 501–513; 379/237–302; 701/99; 702/138; 380/28–54; 364/578; 706/1–62

[56] References Cited

U.S. PATENT DOCUMENTS

| | | | |
|---|---|---|---|
| 5,418,951 | 5/1995 | Damashek | 707/5 |
| 5,590,317 | 12/1996 | Iguchi et al. | 707/2 |
| 5,649,183 | 7/1997 | Berkowitz et al. | 707/6 |
| 5,706,496 | 1/1998 | Noguchi et al. | 707/3 |
| 5,752,051 | 5/1998 | Cohen | 395/751 |

*Primary Examiner*—Thomas G. Black
*Assistant Examiner*—David Yiuk Jung
*Attorney, Agent, or Firm*—Jones, Day, Reavis & Pogue; Blaney Harper

[57] ABSTRACT

A method and apparatus for retrieving similar or identical textual passages among different documents is disclosed. Normal discourse structures along with textual content attributes are used to encode a known passage with "marker sequences" that give a characterizing "signature" to the passage. The encoded known passage is then evaluated against similarly encoded passages appearing in a database of documents. If it is determined that there is a possible match between the encoded known passage and an encoded passage in a database document, a sequential string search is performed to determine whether the two passages are likely to be similar or identical. If the sequential string search records a probable match between the known passage and the database passage, the database passage is displayed for further review.

10 Claims, 3 Drawing Sheets

METHOD AND APPARATUS FOR RETRIEVING TEXT USING DOCUMENT SIGNATURES

FIELD OF THE INVENTION

This invention relates to the field of computerized information search and retrieval systems. More particularly, this invention relates to a method and apparatus for enabling the user to efficiently locate and retrieve similar or identical passages occurring within a document database.

BACKGROUND OF THE INVENTION

Documents are increasingly being represented as digital bits of data and stored in electronic databases. These documents often appear as electronic versions of newspapers, magazines, journals, encyclopedias, books, and other printed materials. Such electronic "texts" can be comprised of miscellaneous strings of characters, words, sentences, paragraphs, or documents of indeterminate or varied lengths and may include a wide variety of data classifications, such as alpha-numerics, symbols, graphics, or bit sequences of any sort. Passages from these electronic texts can be accessed through the use of computers and further republished with astonishing ease and expediency.

Authors and publishers place considerable proprietary value on the textual passages they generate (e.g., newspaper and magazine articles). However, the ease in which textual passages can be duplicated in electronic storage media presents the problem that such passages can be copied and/or incorporated into larger documents without proper attribution or remuneration to the original author. This duplication can occur either without modification to the original passage or with only minor revisions such that original authorship cannot reasonably be disputed.

To guard against the unauthorized republication of such passages, authors and publishers desire an ability to search for their original work in a document database—such as the internet, LEXIS® NEXIS®, DIALOG®, and the like—for the purpose of locating specific instances where unauthorized republication has occurred. Similarly, publishers have a compelling need to ensure that all manuscripts that have been submitted for publication are, in their entirety, original works of authorship. Academic institutions, too, may wish to verify student theses and dissertations to confirm that they do not contain instances of plagiarism before academic credit for the writing can be awarded.

Also, authors and researchers often have a need to locate the source of a given passage but frequently do not know the title, author, date of publication, or other identifying feature of the original work. Unless the user has an exact quotation, it can be very difficult to find the source of the passage in order to give proper recognition to the original author. By enabling the author or researcher to efficiently compare the passages of a given text with documents published elsewhere, the process of finding the original work is significantly enhanced.

These examples highlight the need for an ability to efficiently locate and retrieve similar or identical passages appearing in other texts contained in electronic storage media. To locate and retrieve these passages under conventional document retrieval techniques, users may attempt to utilize a "keyword" or query term search. Under this method, every document existing in the database being searched that contains the keyword or query term selected by the user can be retrieved. This, however, is a very ineffective search technique for comparing passages because the user can easily become overwhelmed with enormous numbers of retrieved documents, most of which will have no relation to the user's particular inquiry.

Another method for locating and retrieving similar or identical passages may be through the use a Boolean search. A Boolean search involves searching for documents containing more than one keyword. This is typically accomplished by joining keywords with conjunctions, such as "AND" and/or "OR". If two or more keywords are joined by an AND, only those texts that contain all the keywords will be identified. If two or more keywords are joined by an OR, all texts that contain at least one of the joined keywords will be identified.

Unfortunately, keyword and Boolean search and retrieval techniques possess many weaknesses. One disadvantage associated with these methods is that the user must anticipate which specific keywords will identify and distinguish relevant texts. If the user fails to select the appropriate keywords or performs a Boolean search that is too restrictive, highly relevant texts might not be identified and thus will be overlooked. The user may not perceive the effects of a high false-negative rate and could become wrongly convinced that the search was successful despite likely missing the very best documents.

A similar disadvantage with keyword and Boolean searches is that a poorly designed query can potentially result in the identification too many documents that satisfy the user's search criteria. This can occur if a selected keyword is too common and/or the user heedlessly employs the conjunction OR to join multiple keywords in a Boolean search. If too many documents are retrieved, the user must expend much time and energy to tediously review each document and extricate the truly relevant documents from the vast collection of those identified as potential matches. Hence, a user frequently must select different keywords (and combinations thereof) in a costly and time-consuming iterative process to either broaden or narrow the search request.

More significantly, although these techniques may inform the user about the presence or absence of specific terms in a given text, they do not provide any insight regarding the actual sequence in which those terms appear in that text. As such, these search and retrieval techniques are not effective for finding strict sequences of information in a given set of documents. When a user is considering such matters as unauthorized republication or plagiarism, the information sought to be extracted from the database goes beyond the mere co-presence of terms or the appearance of a few terms (e.g., noun phrases) in the same order.

More recent text retrieval methods such as vector-space approaches afford more freedom to the user through the implementation of advanced search techniques such as query-term frequencies and similar statistical analyses. However, the principal focus of such techniques is to retrieve documents that most likely epitomize the main concepts associated with the user's search query; as in keyword and Boolean searches, little or no effort is made to actually compare sequential information embodied in specific textual passages. As such, vector-space retrieval techniques are, by themselves, relatively ineffective methods for locating and retrieving similar or identical passages occurring within a database of documents.

One technique that might be utilized to compare sequential information among two or more documents is to perform a sequential string search on all of the documents appearing in the database being searched. A sequential string search examines each document word-by-word to determine whether a string of words matching the string of words in the query exists. Typically, however, users do not know where the starting and ending points of matching strings will occur in the documents being searched.

Consequently, users are forced to scrupulously examine every word of every document in the entire database to determine whether a matching string exists. This can be an extremely slow and inefficient operation, particularly when the database being searched is large and when the known passage being matched against the database is only a few words long.

OBJECTS OF THE INVENTION

It is an object of the present invention to provide a text location and retrieval system.

It is another object of the invention to provide a text location and retrieval system that allows the texts of different documents to be compared for the purpose of locating similar or identical passages.

It is still another object of the invention to provide a text location and retrieval system that compares the texts of different documents in a minimal amount of time.

It is a further object of the invention to provide a text location and retrieval system that enables the user to determine whether a known document (or portions thereof) has been republished elsewhere.

SUMMARY OF THE INVENTION

The present invention provides a method and apparatus for locating and retrieving similar or identical passages among different documents. Toward this end, this invention uses discourse structures along with content attributes to form encoded "marker sequences" that collectively give a characterizing "signature" to a known textual passage. These marker sequences substantially reduce the total amount of information in the passage while still permitting the encodings to be evaluated against a database of similarly encoded (and therefore similarly reduced) documents to identify candidate documents that contain similar or identical passages.

This computer-implemented method and apparatus for retrieving similar and identical passages from database documents incorporates the steps of inputting a known passage into a processing device, converting the known passage into a plurality of first marker sequence encodings, converting the database documents into a plurality of second marker sequence encodings, and evaluating the first marker sequence encodings against the second marker sequence encodings to identify candidate documents. The known passage can further be compared with the candidate documents using a sequential string search of either (1) the first marker sequence encodings against the second marker sequence encodings, or (2) each word contained in the known passage against each word contained in the candidate documents.

These and other aspects and advantages of the present invention will become better understood with reference to the following description, drawings, and appended claims.

BRIEF DESCRIPTION OF THE DRAWINGS

The invention will be described in detail with reference to the following drawings in which like reference numerals refer to like elements and wherein.

DETAILED DESCRIPTION OF THE INVENTION

Figure 1:
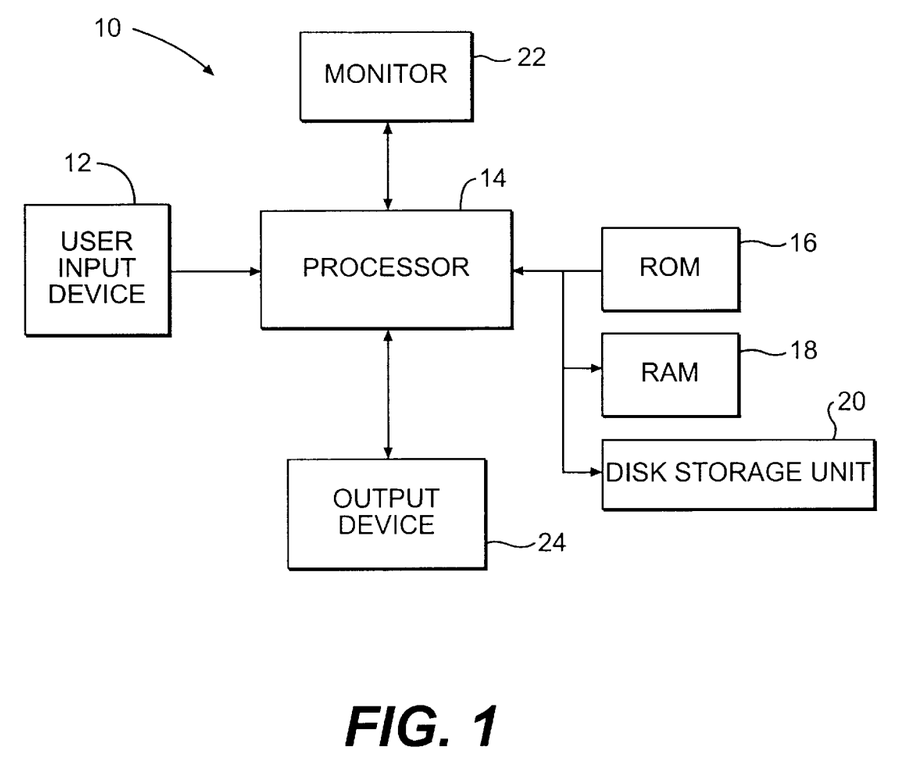
FIG. 1 is a block diagram of one embodiment of the information retrieval system of the present invention.

FIG. 1 is a block diagram of one embodiment according to the invention of an apparatus 10 for retrieving relevant documents based on the similarity and/or identity of the signatures of a known passage and one or more passages of documents existing in a database of documents. The apparatus 10 includes a user input device 12 that may comprise, for example, an image scanner (optical or electronic), a keyboard, a touch screen, a mouse, etc. The image scanner can be a stand-alone device, or part of a facsimile machine or a document reproduction machine (e.g., a photocopier).

A processor 14 is coupled to the user input device 12 for the purpose of generating and comparing the signatures of the known passage and one or more passages of the database documents. The processor 14 operates to perform these functions in accordance with information and instructions received from read only memory (ROM) 16 or disk storage unit 20, and by using random access memory (RAM) 18. Processing results and user input information can be monitored on a CRT display 22. After processor 14 has completed the task of processing the documents, the results can be outputted to an output device 24, which includes, for example, a storage means (hard or floppy disk), a printer, a document reproduction machine (e g., a photocopier), a facsimile machine, or the CRT display 22.

Figure 2:
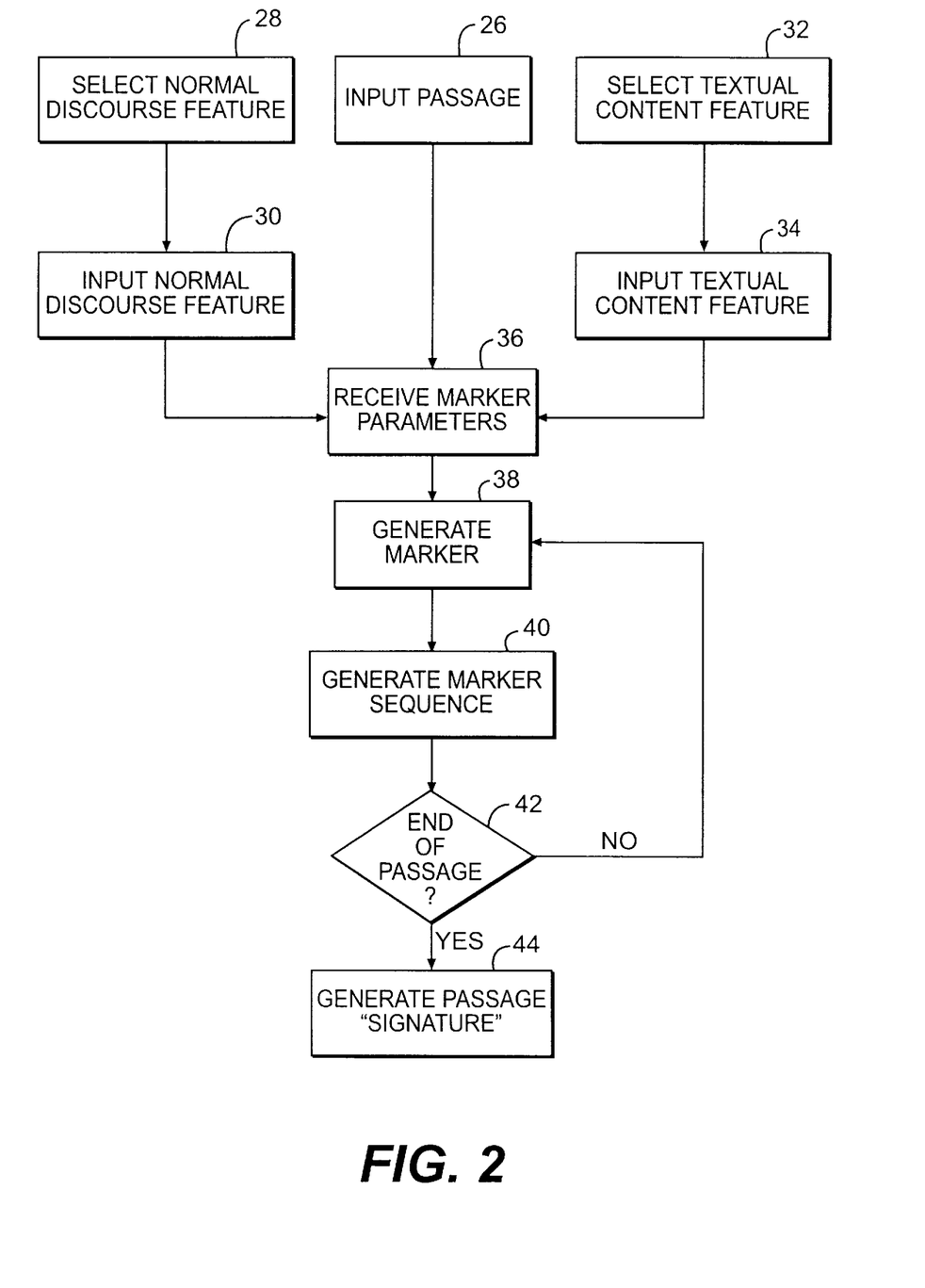
FIG. 2 is a flow chart illustrating a sequence of steps for encoding both known and database documents.

FIG. 2 illustrates the sequence of steps for encoding both known passages and database documents. As a general overview, "markers" appearing within a passage are identified and used to create "marker sequences". These marker sequences are combined to generate a "signature" for the entire passage.

As reflected in steps 28 and 32, the user selects a normal discourse feature 28 (e.g., punctuation marks) along with a textual content feature 32 (e.g, alpha-numeric characters) and inputs (steps 30 and 34) these features (hereinafter referred collectively as "marker parameters") by either utilizing the user input device 12 or by instructing the processor 14 to accept marker parameters from some other source. Of course, the user may set a default whereby the task of selecting these marker parameters is performed automatically without any direct user involvement. Whichever method is selected, the processor 14 then receives these marker parameters as reflected in step 36.

The equivalence classes of the marker parameters can be set arbitrarily. For example, the user can define the normal discourse feature 28 to comprise all characters in an ASCII (American Standard Code for Information Interchange) code range, including the "apostrophe", "period", "semicolon", "question mark", etc. With respect to the textual content feature 32, one might elect to focus on all alpha-numeric characters, but essentially any n-gram sequence (e.g., groups of characters) could be used. One could define a special case, as well, for the purpose of managing two or more successive punctuation elements, perhaps by using a special content character as a surrogate for the missing alpha-numeric; the character "~" may be used, for example.

As reflected in step 26, a known passage is also inputted into the processor 14 through the utilization of the user input device 12. There are a number of ways to input the known passage into the processor 14. One method might be to simply type in the passage by using a keyboard. Another method might be to load a data file containing known passages into the processor 14 (e.g., inserting a floppy disk into the processing unit and retrieving a document contained thereon) and processing the known passages in processor 14. Yet another way to input a known passage might be (1) displaying the known passage on the CRT display 22, (2) highlighting the relevant text by dragging the mouse, and (3) striking a function key on the keyboard or clicking one of the mouse buttons so as to instruct the processor 14 to input that portion of the known passage which has been highlighted.

After the known passage is inputted 26 and the marker parameters have been received 36, "markers" are generated 38 in accordance with the pre-selected marker parameters. In one embodiment, the markers 38 are defined by selecting the combination of punctuation elements along with the alpha-numeric character that immediately precedes each such element. In this situation, each instance where a punctuation element appears in a given passage adjacent to an alpha-numeric character will be treated as a marker 38 by the processor 14. For example, assume the following sentence appears in a given text:

The meal is delicious, isn't it?

In this sentence, there are three instances of punctuation, namely, ",", "'" and "?". If the user selects marker parameters as comprising all punctuation elements in the passage and the alpha-numeric characters that immediately precede them, the three markers 38 in the above example would be "s," and "n" and "t?". These can then be utilized to generate a marker sequence as discussed hereinafter.

In yet another embodiment, whole words associated with the punctuation elements might be used such that the markers 38 in the above example would be "delicious," and "isn't" and "it?". In a further embodiment, all alpha-numeric characters that immediately follow the punctuation elements are used such that the markers 38 in the above example would be ",i" and "'t" and "?~". Another embodiment might generate markers 38 by selecting the first word or character that begins each sentence. A further embodiment might be to select the first character of each word in the passage. Yet another method for defining markers 38 might be to select the first character that appears after each stop character (e.g., each "space" or "dash") or the first character appearing after such words as "a", "an", "of", and "the", etc. As one can see, the possibilities for defining markers 38 in passages are numerous.

Once the markers 38 have been selected, the next step is to generate a "marker sequence", as reflected in step 40. As in the case of defining markers 38, marker sequences 40 can be generated using a variety of methods. One method for generating the marker sequence is to count the distance between markers 38 based upon the number of all non-stop characters (e.g., characters other than "space" or "dash") that occur before each marker 38 and after either the beginning of the document or after the last marker 38 appearing in sequence. By counting the number of non-stop characters that immediately precede each marker 38, the user is able to derive a marker sequence 40 for later searching applications.

The above example "The meal is delicious, isn't it?" can be used to illustrate how an exemplary marker sequence 40 is generated. Because seventeen non-stop characters appear before the marker "s," the first marker sequence 40 could be represented as <<s,>, 17>>. Similarly, because only two of these characters occur between the marker "n'" and the previous marker "s," the second marker sequence 40 could be represented as <<n'>, 2>>. For the same reason, the third marker sequence 40 could be represented as <<t?>, >>. These three marker sequences 40 could then be combined to generate a composite "signature" 44 for the above passage:

<<s,>, 17>>,<<n'>, 2>>,<<t?>, 2>>

As will be described, this string of marker sequences 40 for the known passage can then be evaluated against similarly encoded passages existing within a database of documents to identify database passages with similar or identical signatures 44.

In another embodiment of the present invention, the technique used for generating a particular marker sequence 40 might be to count the distance between markers 38 based on all stop characters (e.g, all "spaces" and "dashes") that occur before the marker 38 and after either the beginning of the document or after the last marker 38 appearing in sequence. Using the preceding example, assume again that the following sentence appears in a given passage:

The meal is delicious, isn't it?

In this example, the three markers 38 in the above sentence could remain as "s," and "n" and "t?". However, the marker sequences 40 would receive a different encoding because there are substantially fewer stop characters occurring within the sentence. With respect to the marker "s," the first marker sequence 40 would receive an encoding of <<s,>, 3>>(only three "spaces" precede the marker "s," in this example). Similarly, the marker sequences 40 associated with markers "n'" and "t?" would receive respective encodings of <<n'>,1>>and<<t?>,1>>(only one "space" appears between each of these markers 38 and the markers 38 that respectively precede them). Based on these three marker sequences 40, the passage could be assigned the following composite "signature" 44:

<<s,>, 3>>,<<n'>,1>>,<<t?>,1 >>

A further embodiment of the invention for generating a marker sequence 40 might be to count the distance between markers 38 based upon the number of intervening words, vowels, capital letters, etc. to obtain marker sequences 40. Still another embodiment might specify that all distances should be counted from the beginning of the document, page, paragraph, sentence, or word, etc. to the marker 38 each time a marker 38 appears.

In another embodiment, the spacing information in a given passage can be omitted altogether such that the marker sequence 40 would essentially appear the same as the marker 38. Using the above example, the passage "The meal is delicious, isn't it?" could be assigned the following signature: <<s,>>,<<n'>>,<<t?>>.

In yet a further embodiment, the character spacing information could be assigned a categorical number. For example, the user might arbitrarily assign the number "1" to represent 0–4 preceding non-stop characters, the number "2" to represent 5–9 preceding non-stop characters, the number "3" to represent 10–14 preceding non-stop characters, the number "4" to represent 15–19 preceding non-stop characters, and so on. In this embodiment, the passage "The meal is delicious, isn't it?" could then be assigned the following signature: <<s,>, 4>>,<<n'>, 1>>,<<t?>, 1>> (there are seventeen non-stop characters preceding the marker "s,", and only two such characters precede the markers "n" and "t?").

Once the known passage has been encoded with a plurality of marker sequences 40, each document in the database is encoded using the same technique used to generate the signature 44 for the known passage (with the exception that the user does not physically input the database passage into the processor 14). That is, the same marker parameters used to encode the known passage are inputted and received by the processor 14 as reflected in step 36. As reflected in step 26, the database documents are inputted into the processor 14 where markers are generated 38 for the database documents in accordance with the technique used for the known passage. These markers are then used to further generate the marker sequences 40 for the database documents so that the marker sequences 40 of the known passage and those of the database documents can be compared. The encoding of the database documents can be performed on the fly, or the database documents can be pre-processed and indexed immediately upon being received into the processor 14.

A unique aspect of the present invention is that two apparently random pieces of information in a marker 38 (each of which gives a perspective on the content of the text—its discourse structure and its content) can be exploited through the use of marker sequence 40 encodings that establish an identifying "signature" for arbitrary stretches of text. These marker sequence 40 encodings serve to substantially reduce the total amount of information in a given text while still permitting the user to search for other similarly encoded (and therefore similarly reduced) passages to determine whether they possess similar or identical sequential information. In addition, the marker sequences 40 capture important sequential information and other characteristics about the text they represent even though the actual text is not directly represented.

Figure 3:
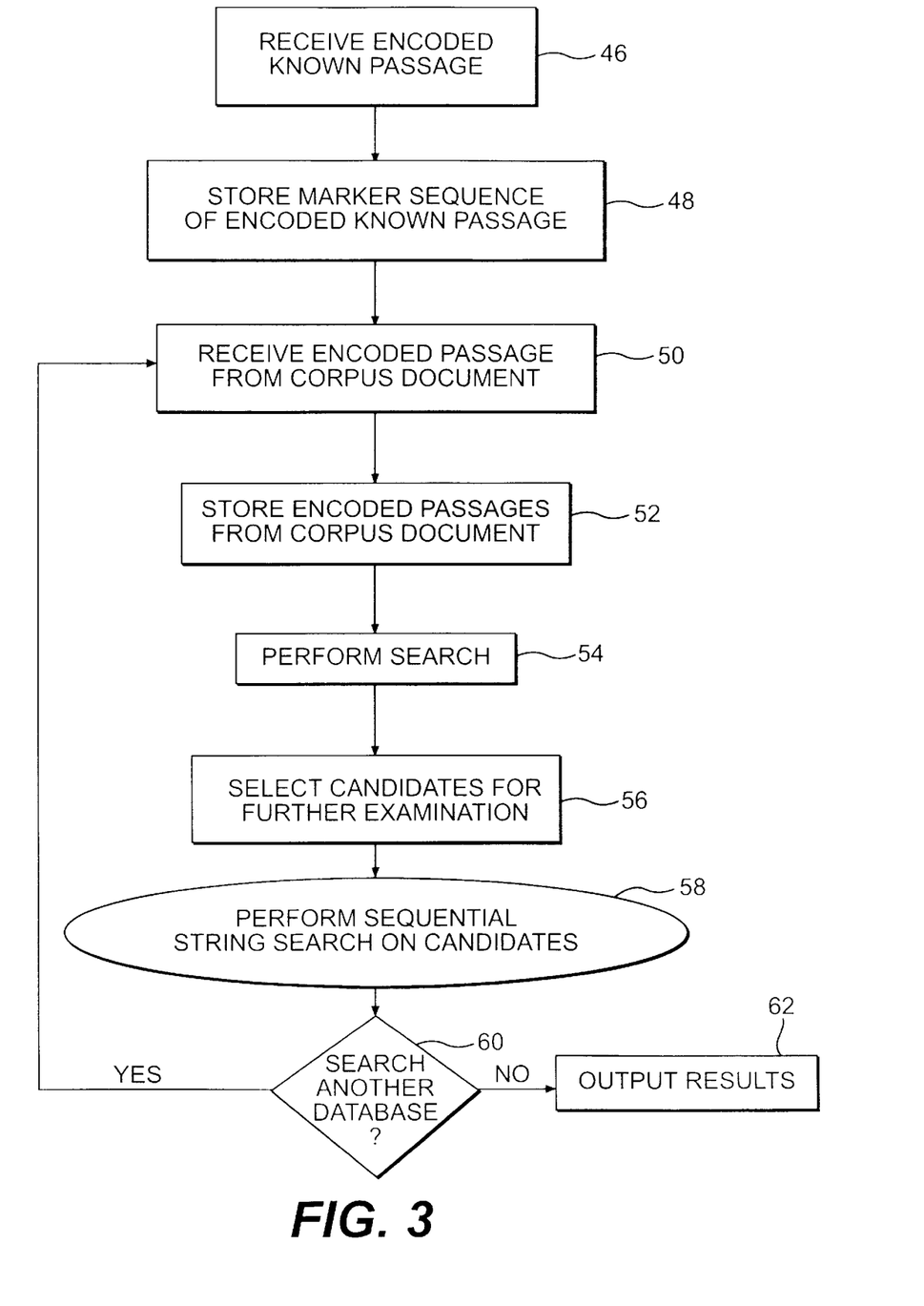
FIG. 3 is a flow chart illustrating a sequence of steps for locating and comparing previously encoded known and database documents and retrieving positive matches.

FIG. 3 depicts the sequence of steps for comparing previously encoded known and database documents and for retrieving positive matches. Toward this end, the encoded known passage is received 46 and the marker sequences 40 stored 48 in the processor 14. One or more encoded passages from the database documents are then received 50 and also stored 52 in the processor 14. A search is then performed using the marker sequences 40 of the known passage as queries to be tested against the passages of the database documents as reflected in step 54.

This search can be performed in a number of ways. In one embodiment, a keyword or Boolean search is performed to identify database documents that contain the same marker sequences that were generated during the initial encoding of the known passage. More preferably, however, an advanced search and retrieval method is utilized that takes advantage of more advanced weighted-term vector space-type retrieval techniques.

In a vector space-type search, a score related to the marker sequences in the known passage is computed for each document contained in the database being searched. In general, the similarity score between a known passage "Q" and a database document "D" can be compared by evaluating the shared and disjoint features of the known passage and the database document over an orthogonal space of T terms that originate from the database being searched. For example, the similarities score can be computed by using the following formula:

$$S(Q_i, D_j) = \frac{(Q_i \cdot D_j)}{|Q| \cdot |D|} = \frac{\sum_{k=1}^{t}(q_{i_k} \cdot d_{i_k})}{\sqrt{\sum_{k=1}^{t} q_{i_k}^2} \cdot \sqrt{\sum_{k=1}^{t} d_{i_k}^2}}$$

This scoring technique can be illustrated on the following sample set of marker sequences and documents in a given database:

| Marker Sequence | $Q_1$ | $Q_2$ | $D_1$ | $D_2$ |
|---|---|---|---|---|
| <<s,>,3>> | 1 | 1 | 2 | — |
| <<c;>,9>> | 1 | — | — | 1 |
| <<l.>,8>> | 1 | — | 1 | — |
| <<n'>,2>> | 1 | — | — | — |
| <<i.>,0>> | 1 | 1 | — | — |
| <<e.>,0>> | — | 1 | 2 | — |
| <<~.,>,0>> | — | 1 | — | 2 |
| <<t?>,7>> | — | — | 3 | — |
| <<s,>,9>> | — | — | 1 | — |
| <<d.>,17>> | — | — | — | 3 |

In this table, the Marker Sequence column lists a union of all the encodings contained in the two documents $D_1$ and $D_2$. The scores of $D_1$ and $D_2$ refer to the frequency of those encodings as they appear in the similarly encoded database documents (which would be much larger in an actual search). The scores of $Q_1$ and $Q_2$ refer to frequency of the marker sequences as they appear in the known passage (which would also be much larger in an actual search). The similarity score of the known marker sequence $Q_1$ to database document $D_1$ is computed as:

$$S_G(Q_1, D_1) = \frac{(1 \cdot 2) + (1 \cdot 1)}{\sqrt{1^2 + 1^2 + 1^2 + 1^2 + 1^2} \cdot \sqrt{2^2 + 1^2 + 2^2 + 3^2 + 1^2}}$$

$$= \frac{3}{\sqrt{5} \cdot \sqrt{19}}$$

$$= 0.31$$

While the similarity of the marker sequence $Q_1$ to the database document $D_2$ is computed as $S(Q_1, D_2) = 0.12$, as can be seen from the above example, the similarity score of marker sequence $Q_1$ to the database document $D_1$ is higher than the similarity score of marker sequence $Q_1$ to database document $D_2$. As a result, the similarity score provides a relative measure of the database document to the marker sequence of the known passage. Because these relative scores can be determined for all documents in the database being searched, the user can empirically determine when scores are meaningful, and as a result, derive significant information from documents that are ranked by their score. Preferably, the documents that are retrieved are rank-ordered so that those with the highest scores are listed first.

In a preferred embodiment, marker sequences containing larger spacing information are given greater weight because they will more likely distinguish similar or identical passages. For example, the marker sequence <<r,>,6>> might appear very frequently because it could represent the string "However," at the beginning of a sentence. To ensure that lower weights are given to such encoded terms, one might compute the value assigned to each marker sequence by performing an inverse document frequency computation (i.e., obtaining a distribution count on the number of documents in which the particular marker sequence appears). Alternatively, and more preferably, one might perform a frequency analysis to determine how often the marker sequence appears in a particular document (the more often the particular marker sequence appears in the document, the lower its weight will be). Combinations of statistical analyses can also be used.

After the search 54 is performed, candidate documents are selected from the database of documents for further examination based on their response to the earlier search as in step 56. A sequential string search is then performed 58 on the encoded candidate documents by comparing—sequentially and iteratively—the marker sequences 40 of the known passage with those of the database documents (this sequential string search may have to be reiterated until the starting point of the known passage is located in the database document). Alternatively, the user may perform the sequential string search on the word level, by comparing the actual words of the encoded known passage with those of the retrieved candidate documents (again, this word-for-word sequential string search may have to be reiterated until the starting point of the known passage is located in the candidate document).

In a preferred embodiment, the marker sequences 40 for each retrieved candidate document can be initially separated into their constituent elements—namely, the marker 38 portion (e.g., "s,") and the spacing information portion (i.e, that portion of the marker sequence 40 which identifies, for example, the number of non-stop characters that precede the marker). The retrieved candidate documents can then be indexed according to the markers 38 for the purpose of identifying those documents that are more likely to contain similar or identical passages. Once these promising documents have been identified, the full version of the marker sequences 40 from the known passage can be evaluated against them. The user then has the option 60 to perform another search in another database. If the user declines to execute another search, the results will be outputted 62. A concrete illustration of this procedure follows.

Suppose that the user decides that the normal discourse feature 28 is punctuation characters, e.g., "comma", "period", and "apostrophe", etc. Suppose further that the textual content feature 32 comprises all alpha-numerics (taken as monograms) and that the character spacing information of the marker sequence is obtained by counting the distance between markers 38 based upon the occurrence of all non-stop characters after either the beginning of the sentence or the previous marker 38 appearing in sequence. Finally, suppose that the character "~" is selected to represent instances where there is no intervening alpha-numeric between punctuation characters.

The passage known to the user is as follows:

Passage 1

Manufacturing of all kinds represents between one-quarter and one-third, or the largest single segment, of the United States gross national product. As the principal source of funding and the largest buyer of goods and services in the country, the U.S. Government, largely through its defense, space, and atomic energy programs, has come to exercise preponderant influence on the Nation's industrial, i.e., heavy and light manufacturing, sector decisions. Which projects and technologies agencies of government choose to emphasize from time to time makes a major impact on a very large segment of the total U.S. economy.

Using the invention, the above passage is encoded with the following set of marker sequences (ie., passage signature):

<< d, > ,60 >> ,<< t, > ,24 >> ,<< t. > ,36 >> ,<< y, > ,76 >> ,<< U. > ,3 >> ,
<< S. > ,0 >> ,<< t, > ,9 >> ,<< e, > ,23 >> ,<< e, > ,4 >> ,<< s, > ,22 >> ,
<< n' > ,48 >> ,<< l, > ,10 >> ,<< i. > ,0 >> ,<< e. > ,0 >> ,<< ~, > ,0 >> ,
<< g, > ,25 >> ,<< s. > ,14 >> ,<< U. > ,125 >> ,<< S. > ,0 >> ,<< y. > ,6 >>

Each of the marker sequences 40 appearing in the above signature are then evaluated against a database of documents (using either a Boolean or vector space-type retrieval method). This search would involve the following query terms:

| << d, > ,60 >> | << S. > ,0 >> | << n' > ,48 >> | << g, > ,25 >> |
| << t, > ,24 >> | << t, > ,9 >> | << l, > ,10 >> | << s. > ,14 >> |
| << t. > ,36 >> | << e, > ,23 >> | << i. > ,0 >> | << U. > ,125 >> |
| << y, > ,76 >> | << e, > ,4 >> | << e. > ,0 >> | << S. > ,0 >> |
| << U. > ,3 >> | << s, > ,22 >> | << ~, > ,0 >> | << y. > ,6 >> |

In the database of documents being searched, the following passage may appear (the text in reality would be much larger):

Passage 2

Manufacturing represents between one-quarter and one-third, or the largest single segment, of the United States gross national product. As the principal source of funding and the largest buyer of goods and services in the country, the federal government, largely through its defense, space, and atomic energy programs, has come to exercise preponderant influence on the Nation's industrial, i.e., heavy and light manufacturing, sector decisions. Decisions as to which projects and technologies will be emphasized by federal agencies from time to time have a major impact on a very large segment of the total U.S. economy. This, too, is encoded using the same marker-sequence technique to generate the following passage "signature":

<< d, > ,50 >> ,<< t, > ,24 >> ,<< t. > ,36 >> ,<< y, > ,76 >> ,<< t, > ,19 >> ,
<< e, > ,23 >> ,<< e, > ,4 >> ,<< s, > ,22 >> ,<< n' > ,48 >> ,<< l, > ,10 >> ,
<< i. > ,0 >> ,<< e. > ,0 >> ,<< ~, > ,0 >> ,<< g, > ,25 >> ,<< s. > ,14 >> ,
<< U. > ,133 >> ,<< S. > ,0 >> ,<< y. > ,6 >>

Based on the results obtained from the search of the marker sequences 40 of Passage 1, Passage 2 is selected as a candidate based on the following shared marker sequences:

<< t, > ,24 >> ,<< t. > ,36 >> ,<< y, > ,76 >> ,<< e, > ,23 >> ,<< e, > ,4 >> ,
<< s, > ,22 >> ,<< n' > ,48 >> ,<< l, > ,10 >> ,<< i. > ,0 >> ,<< e. > ,0 >> ,
<< ~, > ,0 >> ,<< g, > ,25 >> ,<< s. > ,14 >> ,<< S. > ,0 >> ,<< y. > ,6 >> ,

Passage 1 and Passage 2 are then examined more closely by performing a sequential string search and the following shared sequential encodings are revealed:

1.<<t,>,24>>,<<t.>,36>>,<<y,>,76>>
2.<<e,>,23>>,<<e,>,4>>,<<s,22>>,<<n'>, 48>>, <<i.>, 0>>, <<e.>,0 >>,<<,>, 0>>,<<g,>, 25>>,<<s.>, 14>>
3.<<S.>,0>>,<<y.>, 6>>

The presence of these shared marker sequences 40 in the order above is good evidence that there is similar (probably identical) content. Passage 2 can then be retrieved and displayed, for example, on the CRT display 22 for the purpose of confirming whether Passage 2 is, in fact, similar or identical to Passage 1. As one can see, by breaking down the textual components of given passages, it is possible for texts of varying lengths and divergent types to be compared.

Although the present invention has been described and illustrated in considerable detail with reference to certain preferred embodiments thereof, other versions are possible. Upon reading the above description, it will become apparent to persons skilled in the art that changes in the above description or illustrations may be made with respect to form or detail without departing from the spirit or scope of the invention.

I claim:

1. A method for retrieving documents from a database, comprising:
   identifying markers in a first text passage, representing the number of non-marker characters between said identified markers in said first text passage to generate a first marker sequence;
   identifying markers in a plurality of documents from said database;
   representing the number of non-marker characters between identified markers in said plurality of database documents to generate a plurality of database marker sequences; and
   evaluating said first marker sequence against said plurality of database marker sequences to retrieve documents from said database.

2. The method of claim 1 wherein said database documents contain passages that are identical to said first text passage.

3. The method of claim 2, wherein said first text passage is compared with said database documents using a sequential string search of said first marker sequence against said plurality of database marker sequences.

4. The method of claim 1 wherein said database documents contain passages that are similar to said first text passage.

5. The method of claim 4, wherein said first text passage is compared with said database documents using a sequential string search of said first marker sequence against said plurality of database marker sequences.

6. An apparatus for retrieving documents from a database, comprising:
   an input device coupled to a processing unit for selecting a first text passage;
   a storage unit coupled to said processor unit for storing said database documents;
   wherein said processor unit identifies markers in said first text passage and represents the number of non-marker characters between markers in said first text passage to generate a first marker sequence;
   wherein said processor unit identifies markers in a plurality of documents from said database and represents the number of non-marker characters between markers in said plurality of documents from said database to generate a plurality of database marker sequences; and
   wherein said processor evaluates said first marker sequence against said plurality of database marker sequences to retrieve documents from said database.

7. The apparatus of claim 6 wherein said database documents contain passages that are identical to said known passage.

8. The apparatus of claim 7, wherein said first text passage is compared with said database documents using a sequential string search of said first marker sequence against said plurality of database marker sequences.

9. The apparatus of claim 6, wherein said database documents contain passages that are similar to said known passage.

10. The apparatus of claim 9, wherein said first text passage is compared with said database documents using a sequential string search of said first marker sequence against said plurality of database marker sequences.

* * * * *

UNITED STATES PATENT AND TRADEMARK OFFICE
CERTIFICATE OF CORRECTION

PATENT NO.    : 6,029,167                                    Page 1 of 1
DATED         : February 22, 2000
INVENTOR(S)   : David A. Evans It is certified that error appears in the above-identified patent and that said Letters Patent is hereby corrected as shown below:

Column 6,
Line 1, delete "<<t?>,>>" and replace with -- <<t?>,2>> --.

Column 11,
Lines 12-13, delete the following:
   "2. <<e,>,23>>,<<e,>,4>>,<<s,22>>,<<n'>,48>>,<<i.>,0>>,
   <<e.>,0>>, <<,>,0>>,<<g,>,25>>,<<s.>,14>>"

And replace with:

-- 2. <<e,>,23>>,<<e,>,4>>,<<s,>,22>>,<<n'>,48>>,<<I,>,10>>,
   <<i.>,0>>, <<e.>,0>>,<<~,>,0>>,<<g,>,25>>,<<s.>,14>> --

Signed and Sealed this

Fifteenth Day of January, 2002

Attest:

JAMES E. ROGAN
Attesting Officer       Director of the United States Patent and Trademark Office